US012154351B2

(12) United States Patent
Saggu et al.

(10) Patent No.: US 12,154,351 B2
(45) Date of Patent: Nov. 26, 2024

(54) DETERMINING LANES FROM DRIVABLE AREA

(71) Applicant: PlusAI, Inc., Santa Clara, CA (US)

(72) Inventors: Inderjot Singh Saggu, Cupertino, CA (US); Abhishek Bhatia, Savoy, IL (US); Ankur Agarwal, San Jose, CA (US)

(73) Assignee: PlusAI, Inc., Santa Clara, CA (US)

( * ) Notice: Subject to any disclaimer, the term of this patent is extended or adjusted under 35 U.S.C. 154(b) by 0 days.

(21) Appl. No.: 17/977,823

(22) Filed: Oct. 31, 2022

(65) Prior Publication Data

US 2024/0144701 A1 May 2, 2024

(51) Int. Cl.
| | |
|---|---|
| *G06V 20/56* | (2022.01) |
| *G01C 21/00* | (2006.01) |
| *G06T 7/12* | (2017.01) |
| *G06V 10/44* | (2022.01) |
| *G06V 10/774* | (2022.01) |
| *B60W 60/00* | (2020.01) |

(52) U.S. Cl.
CPC ....... *G06V 20/588* (2022.01); *G01C 21/3819* (2020.08); *G01C 21/3837* (2020.08); *G06T 7/12* (2017.01); *G06V 10/44* (2022.01); *G06V 10/774* (2022.01); *B60W 60/001* (2020.02); *B60W 2420/403* (2013.01); *G06T 2207/20021* (2013.01); *G06T 2207/20081* (2013.01); *G06T 2207/30256* (2013.01)

(58) Field of Classification Search
None
See application file for complete search history.

(56) References Cited

U.S. PATENT DOCUMENTS

| | | | | |
|---|---|---|---|---|
| 2018/0046867 | A1* | 2/2018 | Yang | G06F 18/22 |
| 2021/0276564 | A1* | 9/2021 | Efrat Sela | G06F 18/217 |
| 2021/0279484 | A1* | 9/2021 | Mori | G06V 20/588 |
| 2022/0236074 | A1* | 7/2022 | Peng | G06V 10/74 |
| 2023/0177846 | A1* | 6/2023 | Aizawa | B60W 10/18 |

FOREIGN PATENT DOCUMENTS

| | | | | |
|---|---|---|---|---|
| CN | 112862845 A | * | 5/2021 | ......... G06K 9/00798 |

OTHER PUBLICATIONS

Lu, Pingping, et al. "SUPER: A novel lane detection system." IEEE Transactions on Intelligent Vehicles 6.3 (2021): 583-593. (Year: 2021).*

Pizzati, Fabio, et al. "Lane detection and classification using cascaded CNNs." Computer Aided Systems Theory—EUROCAST 2019: 17th International Conference, Las Palmas de Gran Canaria, Spain, Feb. 17-22, 2019, Revised Selected Papers, Part II 17. Springer International Publishing, 2020. (Year: 2020).*

(Continued)

*Primary Examiner* — Sean M Conner
(74) *Attorney, Agent, or Firm* — Sheppard Mullin Richter & Hampton LLP

(57) ABSTRACT

Methods, systems, and non-transitory computer-readable media are configured to perform operations comprising determining an image of an environment. A drivable area and boundary information associated with the environment are determined based on the image. At least one boundary for navigation of the environment is generated based on the drivable area and boundary information.

20 Claims, 8 Drawing Sheets

(56) References Cited

OTHER PUBLICATIONS

Chen, Zhe, and Zijing Chen. "Rbnet: A deep neural network for unified road and road boundary detection." Neural Information Processing: 24th International Conference, ICONIP 2017, Guangzhou, China, Nov. 14-18, 2017, Proceedings, Part I 24. Springer International Publishing, 2017. (Year: 2017).*

Qian, Yeqiang, John M. Dolan, and Ming Yang. "DLT-Net: Joint detection of drivable areas, lane lines, and traffic objects." IEEE Transactions on Intelligent Transportation Systems 21.11 (2019): 4670-4679. (Year: 2019).*

Rasib, Marya, et al. "Pixel level segmentation based drivable road region detection and steering angle estimation method for autonomous driving on unstructured roads." IEEE Access 9 (2021): 167855-167867. (Year: 2021).*

Chen, Qiang, and Hong Wang. "A real-time lane detection algorithm based on a hyperbola-pair model." 2006 IEEE intelligent vehicles symposium. IEEE, 2006. (Year: 2006).*

John, Vijay, et al. "Free space, visible and missing lane marker estimation using the PsiNet and extra trees regression." 2018 24th International Conference on Pattern Recognition (ICPR). IEEE, 2018. (Year: 2018).*

Wu, Zhihuan, et al. "Semantic segmentation of high-resolution remote sensing images using fully convolutional network with adaptive threshold." Connection Science 31.2 (2019): 169-184. (Year: 2019).*

\* cited by examiner

DETERMINING LANES FROM DRIVABLE AREA

FIELD OF THE INVENTION

The present technology relates to autonomous systems. More particularly, the present technology relates to machine learning models that may be used in vehicle autonomous systems.

BACKGROUND

An autonomous system for navigation of a vehicle can plan and control motion for the vehicle. The planning and control functions of the autonomous system rely on data about the vehicle and an environment in which the vehicle is traveling, including the position and movement of other vehicles and objects. The performance of the planning and control functions can depend on such data as the state of the vehicle and the conditions of the environment change.

SUMMARY

Various embodiments of the present technology can include methods, systems, and non-transitory computer readable media configured to perform operations comprising determining an image of an environment. A drivable area and boundary information associated with the environment are determined based on the image. At least one boundary for navigation of the environment is generated based on the drivable area and boundary information.

In some embodiments, a combined data item that includes the drivable area and the boundary information is generated, wherein the at least one boundary for navigation is generated based on the combined data item.

In some embodiments, outer lane information is extracted from the boundary information, wherein the at least one boundary for navigation is generated based on the outer lane information.

In some embodiments, the drivable area and the boundary information associated with the environment are determined based on features extracted from the image.

In some embodiments, the at least one boundary for navigation of the environment is generated based on a first segmentation associated with the drivable area and a second segmentation associated with the boundary information.

In some embodiments, the first segmentation includes segments with first values that indicate pixels in the image correspond with a drivable area or a non-drivable area, and wherein the second segmentation includes segments with second values that indicate the pixels in the image correspond with a dashed lane, a solid lane, a road curb, or a road shoulder.

In some embodiments, the at least one boundary for navigation is generated based on a machine learning model that receives, as input, a combination of the drivable area and at least one solid lane.

In some embodiments, training data to train the machine learning model comprises segmentations of drivable area and outer lane information and labelled segmentations of inner lane information.

In some embodiments, the drivable area is determined based on a first machine learning model and the boundary information is determined based on a second machine learning model, the first machine learning model and the second machine learning model share a neck and a backbone.

In some embodiments, a lane in the environment is determined based on the at least one boundary.

It should be appreciated that many other embodiments, features, applications, and variations of the present technology will be apparent from the following detailed description and from the accompanying drawings. Additional and alternative implementations of the methods, non-transitory computer readable media, systems, and structures described herein can be employed without departing from the principles of the present technology.

Figure 1:
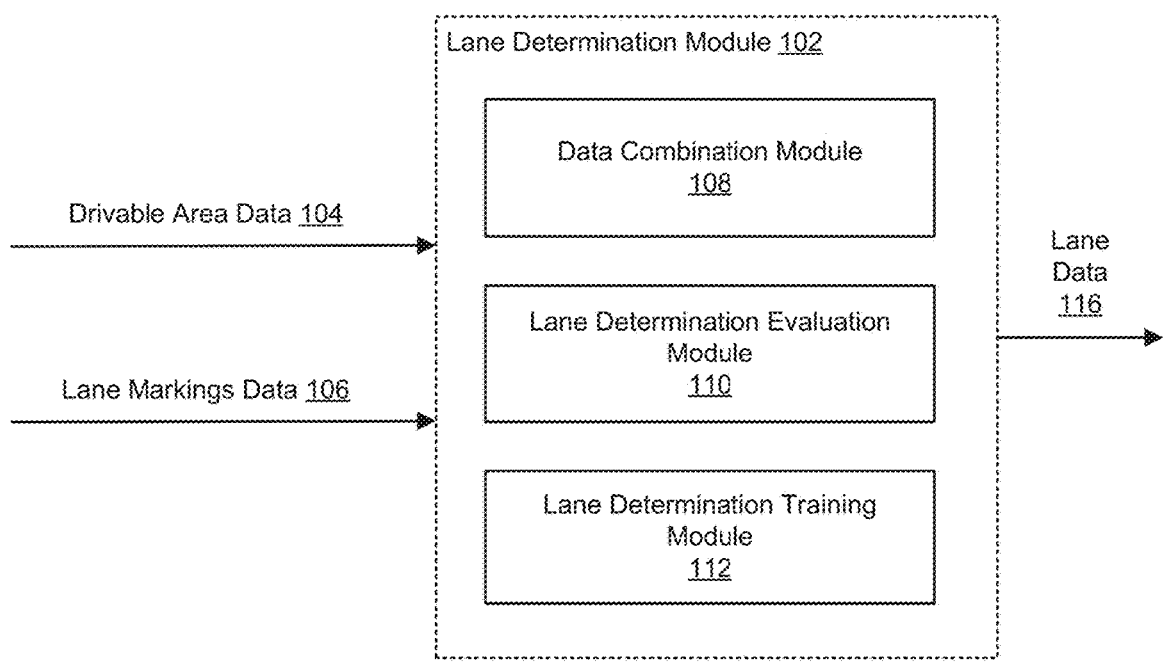
FIG. 1 illustrates an example system associated with generating lane boundary information, according to embodiments of the present technology.

The figures depict various embodiments of the present technology for purposes of illustration only, wherein the figures use like reference numerals to identify like elements. One skilled in the art will readily recognize from the following discussion that alternative embodiments of the structures and methods illustrated in the figures can be employed without departing from the principles of the present technology described herein.

DETAILED DESCRIPTION

Approaches for Determining Lanes from Drivable Area

An autonomous system for navigation of a vehicle can plan and control motion for the vehicle. The planning and control functions of the autonomous system rely on data about the vehicle and an environment in which the vehicle is traveling, including the position and movement of other vehicles and objects. The performance of the planning and control functions can depend on such data as the state of the vehicle and the conditions of the environment change.

Understanding an environment in which a vehicle having an autonomous system of navigation (e.g., ego vehicle) is traveling is fundamental to planning and control functions of the vehicle. For example, a truck traveling in an environment can plan a safe route to travel in the environment based on an understanding of the environment. The understanding of the environment can involve identifying objects such as other vehicles, pedestrians, traffic signals, etc. The understanding of the environment can also involve determining a drivable area (e.g., road surface) of the environment and various boundaries (e.g., lane boundaries, road curbs, road shoulders). In many cases, a vehicle relies on machine learning models to facilitate understanding of an environment in which the vehicle is traveling. For example, a truck can rely on a machine learning model to determine a drivable area of the environment and various boundaries, such as lane boundaries, associated with the drivable area. In this example, the truck can plan a safe route to travel within lane boundaries, indicated by lane markings of the drivable area.

However, under conventional approaches, determination of lane boundaries associated with a drivable area poses various technological challenges. In some cases, an environment may not have visible lane markings. For example, a road may not have visible lane markings because the lane markings have faded. In these cases, a machine learning model that relies on RGB image data may fail to detect the lane markings because the lane markings are not visible. The machine learning model may therefore fail to determine lane boundaries associated with the environment. As a result, a vehicle that relies on the machine learning model to determine the lane boundaries associated with the environment may be unable to plan a safe route through the environment due to the lack of lane boundary information. In some cases, an environment may have duplicate lane markings or other markings that are detected as lane markings, such as tire marks, road cracks, road patches, etc. For example, new lane markings can be painted on a road with preexisting faded lane markings. The new lane markings may be painted adjacent to the faded lane markings, instead of directly over the faded lane markings. In these cases, a machine learning model that relies on RGB image data may detect the duplicate lane markings (e.g., the faded lane markings) or the other markings as false positives. The machine learning model may fail to accurately determine lane boundaries associated with a drivable area of the environment because of the false positives. A vehicle that relies on the machine learning model to determine the lane boundaries associated with the environment may be unable to plan a safe route through the environment due to the inaccurate boundary information. Thus, conventional approaches that fail to accurately determine boundaries, such as lane markings, can pose significant technological challenges.

The present technology provides improved approaches for determining lane boundaries associated with a drivable area that overcome the aforementioned and other technological challenges. In various embodiments, the present technology can determine lane boundaries for a drivable area of an environment. The lane boundaries can be determined based on a machine learning model. The machine learning model can be trained to generate lane boundary information (e.g., lane markings) for an environment based on image data (e.g., camera data, RGB data) of an environment. A drivable area of the environment can be determined based on the image data. The drivable area can correspond with, for example, a road surface of the environment. Outer lane information of the drivable area also can be determined based on the image data. The outer lane information can correspond with, for example, the outermost lane markings (e.g., solid lane markings, road curbs, road shoulders) of the road surface. The machine learning model can generate lane boundary information that indicates one or more inner lane information (e.g., dashed lane markings). Based on the one or more inner lane information, lanes in the drivable area can be determined. The machine learning model can be trained based on training data that includes training instances of drivable area and lane information (e.g., solid lane, dashed lane, road curb, road shoulder). The training instances of drivable area and outer lane information can have corresponding labels for inner lane information, outer lane information, road curbs, and road shoulders.

In various embodiments, the drivable area and the outer lane information can be determined based on one or more machine learning models. For example, a first machine learning model can detect lane markings and a drivable area based on image data. Solid lane markings detected by the first machine learning model can be combined with the drivable area detected by the first machine learning model to generate a combined data item of the drivable area and the solid lane markings. A second machine learning model can generate dashed lane boundary information based on the combined data item. Lanes can be determined based on the generated lane boundary information. The first machine learning model can be trained based on training data that includes instances of image data and corresponding labels for drivable area, road curbs/shoulders, dashed lane markings, and solid lane markings. The second machine learning model can be trained based on training data that includes instances of combined data items and corresponding labels for dashed lane markings. Thus, the present technology provides improved approaches for determining lane boundaries associated with a drivable area by determining lanes for an environment where lane markings are not visible or cannot be clearly detected (e.g., lane markings are faded, other markings cause false positives, etc.). These and other inventive features and related advantages of the various embodiments of the present technology are discussed in more detail herein.

FIG. 1 illustrates an example system 100 including a lane determination module 102, according to some embodiments of the present technology. In some embodiments, the lane determination module 102 can provide support for various functions of an autonomous system of navigation of any type of vehicle, such as an autonomous vehicle. The lane determination module 102 can generate lane data 116. The lane data 116 can include lane boundary information of an environment, describe lane markings of the environment, or describe lanes of the environment. For example, the lane data 116 can be inner lane information, such as dashed lane markings. The lane data 116 can support or be implemented as part of a perception function of an autonomous system of a vehicle, such as a perception module 612 of an autonomous system 610 of FIG. 6, as discussed in more detail below. The lane determination module 102 can generate the lane data 116 based on various data, such as drivable area data 104 and lane markings data 106. The lane determination module 102 can generate the lane data 116 based on various machine learning methodologies. For example, the lane determination module 102 can train a machine learning model to generate the lane data 116 based on the drivable area data 104 and the lane markings data 106. While lane markings and vehicle navigation are discussed herein as examples of an application of the present technology, various other types of boundaries can be determined for various environments in accordance with the present technology.

In some embodiments, some or all of the functionality performed by the lane determination module 102 may be performed by one or more computing systems implemented in a vehicle. In some embodiments, some or all of the functionality performed by the lane determination module 102 may be performed by one or more computing systems. In some embodiments, some or all of the functionality performed by the lane determination module 102 may be performed by one or more backend computing systems (e.g., remote from a vehicle). In some embodiments, some or all of the functionality performed by the lane determination module 102 may be performed by one or more computing systems associated with (e.g., carried by) one or more users riding in a vehicle. In some embodiments, some or all data processed and/or stored by the lane determination module 102 can be stored in a data store (e.g., local to the lane determination module 102) or other storage system (e.g., cloud storage remote from the lane determination module 102). The components (e.g., modules, elements, etc.) shown in this figure and all figures herein, as well as their described functionality, are exemplary only. Other implementations of the present technology may include additional, fewer, integrated, or different components and related functionality. Some components and related functionality may not be shown or described so as not to obscure relevant details. In various embodiments, one or more of the functionalities described in connection with the lane determination module 102 can be implemented in any suitable combinations. Functionalities of the lane determination module 102 or variations thereof may be further discussed herein or shown in other figures.

As referenced or suggested herein, autonomous vehicles can include, for example, a fully autonomous vehicle, a partially autonomous vehicle, a vehicle with driver assistance, or an autonomous capable vehicle. The capabilities of autonomous vehicles can be associated with a classification system or taxonomy having tiered levels of autonomy. A classification system can be specified by, for example, industry standards or governmental guidelines. For example, based on the SAE standard, the levels of autonomy can be considered using a taxonomy such as level 0 (momentary driver assistance), level 1 (driver assistance), level 2 (additional assistance), level 3 (conditional assistance), level 4 (high automation), and level 5 (full automation without any driver intervention). Following this example, an autonomous vehicle can be capable of operating, in some instances, in at least one of levels 0 through 5. According to various embodiments, an autonomous capable vehicle may refer to a vehicle that can be operated by a driver manually (that is, without the autonomous capability activated) while being capable of operating in at least one of levels 0 through 5 upon activation of an autonomous mode. As used herein, the term "driver" may refer to a local operator (e.g., an operator in the vehicle) or a remote operator (e.g., an operator physically remote from and not in the vehicle). The autonomous vehicle may operate solely at a given level (e.g., level 2 additional assistance or level 5 full automation) for at least a period of time or during the entire operating time of the autonomous vehicle. Other classification systems can provide other levels of autonomy characterized by different vehicle capabilities.

The lane determination module 102 can include a data combination module 108. The data combination module 108 can combine the drivable area data 104 and the lane markings data 106 to generate a combined data item that includes data describing a drivable area of an environment and data describing outer lane information of the drivable area. The drivable area data 104 can include data that describes a region in an environment, such as a road surface, where a vehicle can navigate safely. The drivable area data 104 can include a segmentation (e.g., pixel-wise segmentation) of the environment. Each segment in the segmentation can include a value indicating a class of the segment. The value can be a first value (e.g., "1") to indicate the segment is associated with a drivable area. The value can be a second value (e.g., "0") to indicate the segment is associated with a non-drivable area. In some cases, the segmentation is a pixel-wise segmentation associated with an image of an environment. The pixel-wise segmentation can include a segment for each pixel of the image. Each segment in the pixel-wise segmentation can include a value indicating whether the corresponding pixel of the image depicts a drivable area or a non-drivable area. The lane markings data 106 can include data describing detected lane boundaries in an environment, such as boundaries indicated by lane markings on a road surface in the environment. The lane markings data 106 can include a segmentation (e.g., pixel-wise segmentation) of the environment. Each segment in the segmentation can include a value indicating a class of the segment. The value can be a first value (e.g., red) to indicate the segment is associated with an outer lane (e.g., solid lane marking). The value can be a second value (e.g., green) to indicate the segment is associated with an inner lane (e.g., dashed lane marking). The value can be a third value (e.g., blue) to indicate the segment is associated with a road curb or road shoulder. The value can be a fourth value (e.g., black, null) to indicate the segment is not associated with a lane marking, road curb, or road shoulder. In some cases, the segmentation is a pixel-wise segmentation associated with an image of an environment. The pixel-wise segmentation can include a segment for each pixel of the image. Each segment in the pixel-wise segmentation can include a value indicating whether the corresponding pixel of the image depicts a solid lane, a dashed lane, a road curb or road shoulder, or none of these things. Many variations are possible.

The data combination module 108 can combine data describing a drivable area (e.g., from the drivable area data 104) of an environment and data describing outer lane information (e.g., from the lane markings data 106) of the environment to generate a combined data item that includes the data describing the drivable area of the environment and the data describing the outer lane information of the environment. The data combination module 108 can combine the data describing the drivable area with the data describing the outer lane information based on a concatenation of the data describing the drivable area with the data describing the outer lane information. In some cases, the data combination module 108 can overlay the data describing the outer lane information over the data describing the drivable area. For example, the data combination module 108 can receive data describing a drivable area of an environment, such as a highway, and data describing outer lane information for the drivable area. The data describing the drivable area can include, for example, a first segmentation of an image of the highway. Each segment in the first segmentation can include a value indicating whether the segment corresponds with a drivable area or a non-drivable area. The data describing the outer lane information for the drivable area can include, for example, a second segmentation of the image of the highway. Each segment in the second segmentation can include a value indicating whether the segment corresponds with an outer lane or a road curb. The data combination module 108 can overlay the second segmentation over the first segmentation to generate a combined data item. The combined data item can include a third segmentation of the image of the highway. Each segment in the third segmentation can include a value indicating whether the segment corresponds with a drivable area, a non-drivable area, an outer lane, or a road curb.

In some cases, the data combination module 108 can combine the data describing the drivable area and the data describing the outer lane information based on a rectified linear unit (ReLU) activation function. The data describing the drivable area can be passed through a ReLU activation function after removing low confidence detections that fail to satisfy a threshold confidence level (or value). For example, a segmentation of an image of an environment that indicates a drivable area of the environment can include segments with values that indicate a confidence level, or probability value, that the segments correspond with the drivable area. The segments with confidence levels or probability values that fail to satisfy a threshold confidence level or threshold probability value are removed. The segmentation can be passed through a ReLU activation function:

drivable_area=ReLU(drivable_area−drivable_area_thresh)

where drivable_area is a segmentation of an image of an environment that indicates a drivable area of the environment, drivable_area_thresh is a threshold confidence value, and ReLU is a ReLU activation function. The segmentation that has passed through the ReLU activation function can be normalized by scaling the values in the segmentation:

$$\frac{1}{(1 - \text{drivable\_area\_thresh})}$$

where drivable_area_thresh is the threshold confidence value. The data describing the outer lane information can be passed through a ReLU activation function after removing low confidence detections that fail to satisfy a threshold confidence level (or value). For example, a segmentation of an image of an environment that indicates outer lane information of the environment can include segments with values that indicate a confidence, or probability, that the segments correspond with an outer lane, or a solid lane marking. The segments with values that fail to satisfy a threshold confidence level, or threshold probability value, are removed. The segmentation can be passed through a ReLU activation function:

solid=ReLU(solid−solid_thresh)

where solid is a segmentation of an image of an environment that indicates outer lane information of the environment, solid_thresh is a threshold confidence value, and ReLU is a ReLU activation function. The segmentation that has passed through the ReLU activation function can be normalized by scaling the values in the segmentation:

$$\frac{1}{(1 - \text{solid\_thresh})}$$

where solid_thresh is the threshold confidence value. Segmentations that indicate drivable areas and segmentations that indicate outer lane information that have passed through a ReLU activation function and normalized can be combined (e.g., concatenated) to generate a combined data item. Many variations are possible.

In some cases, the drivable area data 104 and the lane markings data 106 can be generated by one or more machine learning models. The drivable area data 104 and the lane markings data 106 can be generated based on image data (e.g., camera data, RGB data) of an environment. For example, image data of an environment can be provided to a first machine learning model. The first machine learning model can be trained to generate a first segmentation of an image of the environment that indicates a region corresponding with a drivable area of the environment. The image data of the environment can be provided to a second machine learning model. The second machine learning model can be trained to generate a second segmentation of the image of the environment that indicates lane boundaries in the environment. The first segmentation and the second segmentation can be combined (e.g., concatenated, overlaid) to generate a third segmentation of the image of the environment that indicates drivable area of the environment and outer boundaries of the environment. While the foregoing example illustrates the first machine learning model and the second machine learning model as separate machine learning models in some embodiments, the functionality described with respect to the first machine learning model and the second machine learning model can be performed by one machine learning model in other embodiments. For example, a machine learning model can include a backbone, a neck, a first head for detecting drivable area, and a second head for detecting lane boundaries. The backbone (e.g., RepVGG convolutional neural network) can extract features from image data of an environment. The neck (e.g., Bi-directional Feature Pyramid Network (Bi-FPN)) can combine features for information sharing among the first head and the second head. The first head can detect a drivable area of an environment based on the combined features. The second head can detect lane boundaries of the environment based on the combined features. The first head and the second head can be implemented, for example, based on convolutional layers trained for their respective tasks. Many variations are possible.

In some cases, the lane markings data 106 can include data indicating solid lanes, dashed lanes, and road curbs or road shoulders of an environment. The data combination module 108 can extract the data indicating the outer lanes and the road curbs or the road shoulders from the lane markings data 106 and discard the data indicating the inner lanes. In some cases, data indicating inner lanes of an environment can be based on markings (e.g., duplicate lane markings, tire marks, road cracks, road patches) that cause false positives. Accordingly, in some cases, the data indicating the inner lanes of the environment can be discarded. Many variations are possible.

In various embodiments, the lane determination module 102 can include a lane determination evaluation module 110. The lane determination evaluation module 110 can generate lane boundary information for an environment. The lane boundary information can be generated based on a combined data item that includes data describing a drivable area (e.g., from the drivable area data 104) of the environment and data describing outer lane information (e.g., from the lane markings data 106) of the environment. The lane determination evaluation module 110 can generate the lane boundary information based on a machine learning model. The machine learning model can be trained to generate lane boundary information for an environment based on combined data that includes data describing a drivable area of the environment and data describing outer lane information of the environment. The generated lane boundary information can include a segmentation that indicates inner lane information, such as inner lane boundaries (or markings), for an image of the environment. Each segment in the segmentation can include a value that indicates a probability the segment corresponds with an inner lane. Segments with values that satisfy a threshold probability value can correspond with where an inner lane boundary is located in the image. For example, a vehicle can travel a highway with faded lane markings. The vehicle can capture an image of the highway (e.g., through one or more front facing cameras). Based on the image of the highway, data describing a drivable area of the highway and data describing outer lane information of the highway can be provided to a machine learning model. The machine learning model can generate a segmentation for the image of the highway. The segments in the segmentation that include values that satisfy a threshold probability value can correspond with pixels in the image of the highway that are associated with an inner lane boundary. Based on the segmentation, the vehicle can determine where the inner lane boundaries of the highway are located even though the lane markings of the highway are faded. Many variations are possible.

In various embodiments, the lane determination module 102 can include a lane determination training module 112. The lane determination training module 112 can train a machine learning model to generate lane boundary information for an environment. The machine learning model can be trained based on training data. The training data can include segmentations of drivable areas and outer lane information and associated segmentations of inner lane information. In some case, the segmentations of drivable areas and outer lane information and the associated segmentations of inner lane information can be generated based on outputs of a trained machine learning model (e.g., lane and drivable area model). In some cases the segmentations of drivable area and outer lane information and the associated segmentations of inner lane information can be based on image data labelled with the drivable area, the outer lane information, and the inner lane information. For example, segmentations of drivable areas and outer lane information can be provided to a machine learning model. The outputs generated by the machine learning model can be compared with segmentations of inner lane information associated with the segmentations of drivable areas and outer lane information. The machine learning model can be trained based on a minimization of a loss function associated with the outputs generated by the machine learning model and the segmentations of inner lane information (e.g., through backpropagation). Through training of the machine learning model, the machine learning model can learn to incorporate factors such as how wide a drivable area is, an amount of space between outer lanes of the drivable area, or where the outer lanes are located in generating its outputs.

In some cases, a machine learning model for generating lane boundary information for an environment can be trained in association (e.g., end to end) with machine learning models for detecting drivable areas and detecting lane boundaries (e.g., a lane and drivable area model). Training data for training the machine learning models can include images labelled with drivable area and lane boundary information, which can include outer lane information and inner lane information. For example, a first machine learning model for detecting drivable areas can be trained based on images including a drivable area and corresponding labels for the drivable area. The images can be provided to the first machine learning model. Outputs of the first machine learning model can be compared with corresponding labels for the drivable area. The first machine learning model can be trained to minimize a loss function associated with the outputs of the first machine learning model and the corresponding labels for the drivable area. A second machine learning model for detecting lane boundary information can be trained based on images including lane boundary information such as outer lane information and inner lane information and the corresponding labels for the lane boundary information. The images can be provided to the second machine learning model. Outputs of the second machine learning model can be compared with the corresponding labels for the lane boundary information, including the outer lane information and the inner lane information. The second machine learning model can be trained to minimize a loss function associated with the outputs of the second machine learning model and corresponding labels for the lane boundary information, including the outer lane information and the inner lane information. A third machine learning model for generating lane boundary information can be trained based on the outputs of the first machine learning model for detecting drivable areas, the outputs of the second machine learning model for detecting lane boundary information, and corresponding labels for the lane boundary information, including the inner lane information. The outputs of the first machine learning model for detecting drivable areas and the outputs of the second machine learning model for detecting lane boundary information can be provided to the third machine learning model for generating lane boundary information. Outputs of the third machine learning model for generating lane boundary information can be compared with the corresponding labels for the lane boundary information, including the inner lane information. The third machine learning model for generating lane boundary information can be trained to minimize a loss function associated with the outputs of the third machine learning model and the corresponding labels for the lane boundary information. Many variations are possible.

In various embodiments, the lane determination module 102 can generate lane data 116 based on the drivable area data 104 and the lane markings data 106. The lane data 116 can include lane boundaries for an environment. In some cases, the lane data 116 can be used by a perception system to determine locations of lane boundaries in an environment where lane markings are not visible or in an environment where duplicate lane markings or other markings cause false positives (e.g., incorrect detection of lane markings). The perception system can use the locations of the lane boundaries to determine locations of lanes in the environment. Navigation through the environment can be based on the locations of the lanes in the environment. In some cases, the lane data 116 can be used by a perception system in an environment where lane markings are visible. In cases where the lane markings are visible, locations of lane boundaries can be determined based on detections of lane markings in the environment. The locations of the lane boundaries can also be determined based on the lane data 116. The perception system can compare the locations of the lane boundaries as determined based on the detections of the lane markings with the locations of the lane boundaries based on the lane data 116. If a difference between the locations of the lane boundaries as determined based on the detections of the lane markings and the locations of the lane boundaries based on the lane data 116 exceed a threshold difference value, data associated with the detections of the lane markings and the lane data 116 can be flagged for review. The perception system can determine the locations of the lane boundaries based on prior locations determined for the lane boundaries. The perception system can determine whether the locations of the lane boundaries based on the detections of the lane markings or the locations of the lane boundaries based on the lane data 116 are more closely aligned with the prior locations determined for the lane boundaries. The locations of the lane boundaries that more closely aligned with the prior locations can be used to determine lanes for the environment. If the difference between the locations are within the threshold difference value, the lane data 116 can confirm the detections of the lane markings are accurate (and vice versa). The perception system can determine the locations of the lane boundaries based on the detections of the lane markings or the lane data 116. Many variations are possible.

Figure 2:
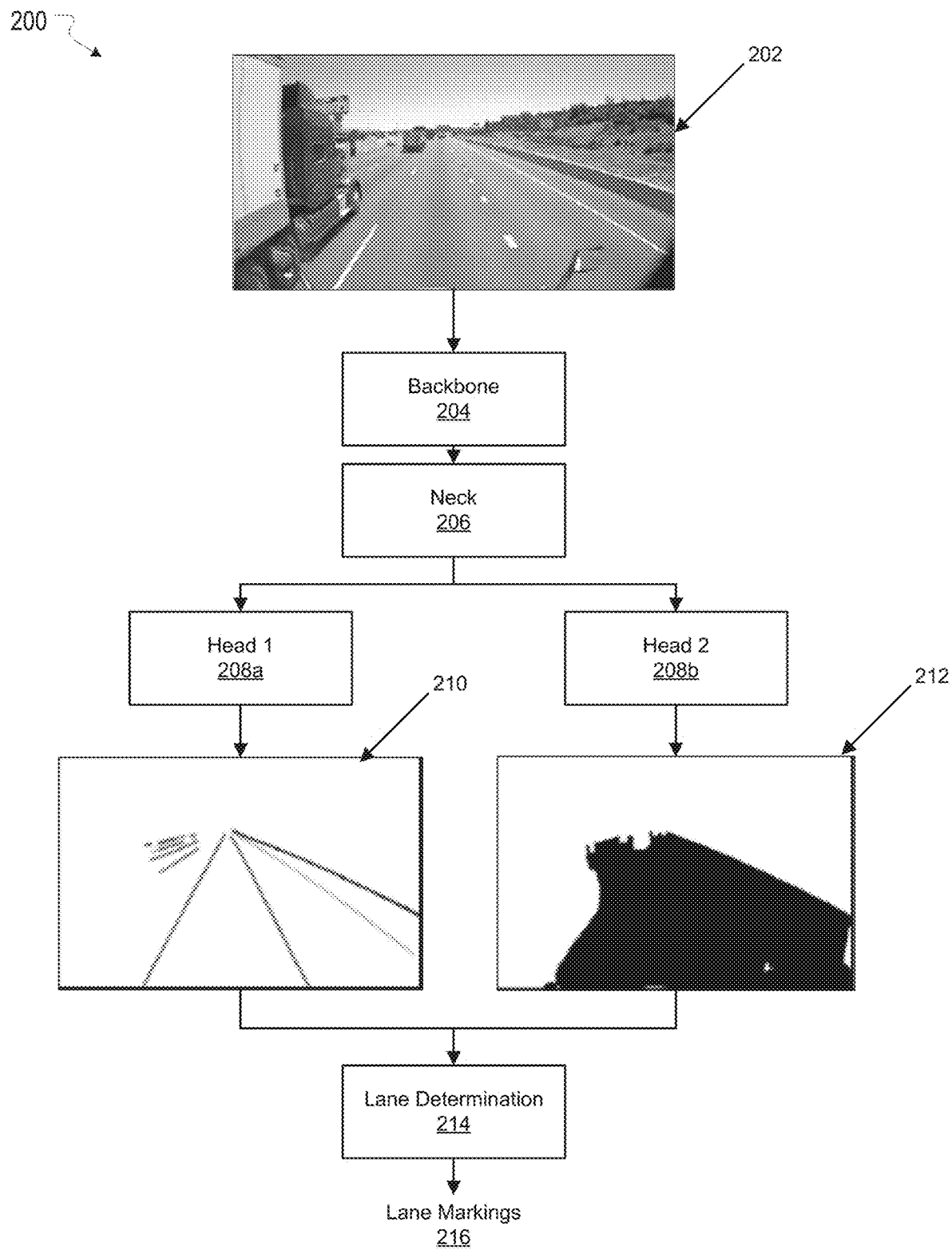
FIG. 2 illustrates an example block diagram associated with generating lane boundary information, according to embodiments of the present technology.

FIG. 2 illustrates an example block diagram 200 associated with generating lane boundary information, according to some embodiments of the present technology. The various functionality described herein for generating the lane boundary information can be performed by, for example, the lane determination module 102 of FIG. 1. It should be understood that there can be additional, fewer, or alternative blocks, functionality, or steps performed in similar or alternative orders, or in parallel, based on the various features and embodiments discussed herein unless otherwise stated.

As illustrated in FIG. 2, an image 202 can be provided to a backbone 204 of a machine learning model (e.g., deep learning model). The backbone 204 can extract features from the image 202. The extracted features can be provided to a neck 206 of the machine learning model. The neck 206 can combine the extracted features at different scales for information sharing among, for example, head 1 208a and head 2 208b. A first set of combined features is provided to the head 1 208a. A second set of combined features is provided to the head 2 208b. The head 1 208a and the head 2 208b can use the combined features provided by the neck 206 to extract task specific information. In this example, the head 1 208a is a lane detection model that detects lane markings in the image 202. The head 1 208a produces a first segmentation 210 of the detected lane markings. In this example, the head 2 208b is a drivable area model that detects a drivable area in the image 202. The head 2 208b produces a second segmentation 212 of the drivable area. The first segmentation 210 and the second segmentation 212 are provided to a lane determination model 214. The lane determination model 214 combines the first segmentation and the second segmentation and generates lane markings 216 based on the combination. The lane markings 216 can be lane boundaries determined based on outer lane information provided in the first segmentation 210 and the drivable area provided in the second segmentation 212. Many variations are possible.

Figure 3:
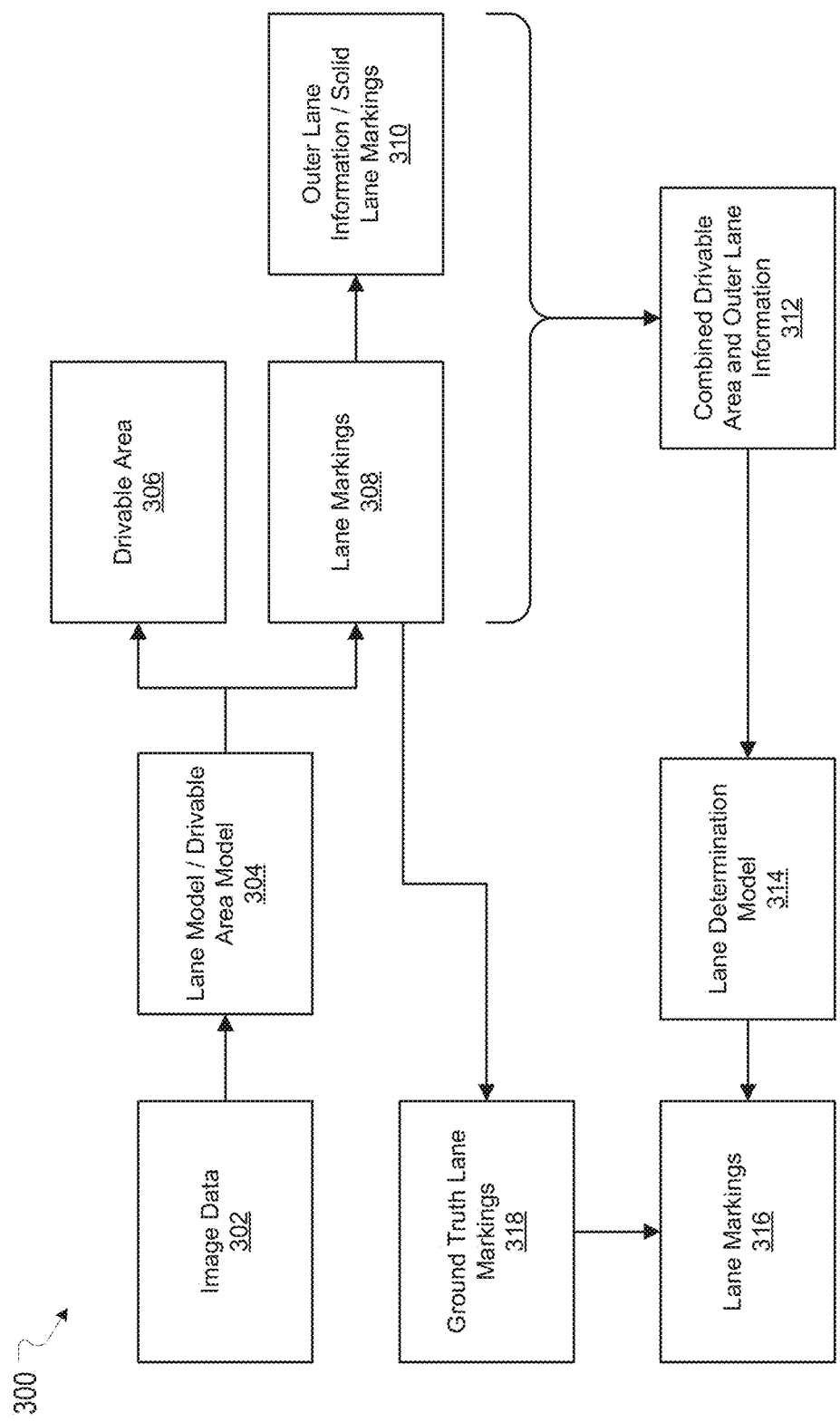
FIG. 3 illustrates an example block diagram associated with generating lane boundary information, according to embodiments of the present technology.

FIG. 3 illustrates an example block diagram 300 associated with training a lane determination model, according to some embodiments of the present technology. The various functionality described herein for training the lane determination model can be performed by, for example, the lane determination module 102 of FIG. 1. It should be understood that there can be additional, fewer, or alternative blocks, functionality, or steps performed in similar or alternative orders, or in parallel, based on the various features and embodiments discussed herein unless otherwise stated.

As illustrated in FIG. 3, image data 302 can be provided to a lane model/drivable area model 304. The lane model/drivable area model 304 can generate a drivable area 306 and lane markings 308 based on the image data 302. The drivable area 306 can include data describing drivable areas detected in the image data 302. The lane markings 308 can include data describing lane markings detected in the image data 302. Based on the lane markings 308, outer lane information/solid lane markings 310 can be generated. The outer lane information/solid lane markings 310 can include data describing outer lanes, or solid lane markings, detected in the image data 302. The outer lane information/solid lane markings 310 and the drivable area 306 can be combined to generate combined drivable area and outer lane information 312. The combined drivable area and outer lane information 312 can include data describing drivable areas detected in the image data 302 and data describing outer lanes, or solid lane markings, detected in the image data 302. The combined drivable area and outer lane information 312 can be provided to a lane determination model 314 as training data. The lane determination model 314 can generate lane markings 316 based on the combined drivable area and outer lane information 312. The lane markings 316 generated by the lane determination model 314 can be compared with ground truth lane markings 318. The ground truth lane markings 318 can include data describing detected inner lanes, or dashed lane markings, based on the lane markings 308 generated by the lane model/drivable area model 304. The detected inner lanes can be used as labelled inner lanes for training the lane determination model 314. In some cases, the ground truth lane markings 318 can be based on labelled lane markings corresponding with the image data 302. The lane determination model 314 can be trained based on labelled inner lanes corresponding with the image data 302. Training the lane determination model 314 can involve minimizing differences between the generated lane markings 316 and the ground truth lane markings 318 by optimizing a loss function and performing backpropagation. Many variations are possible.

Figure 4A:
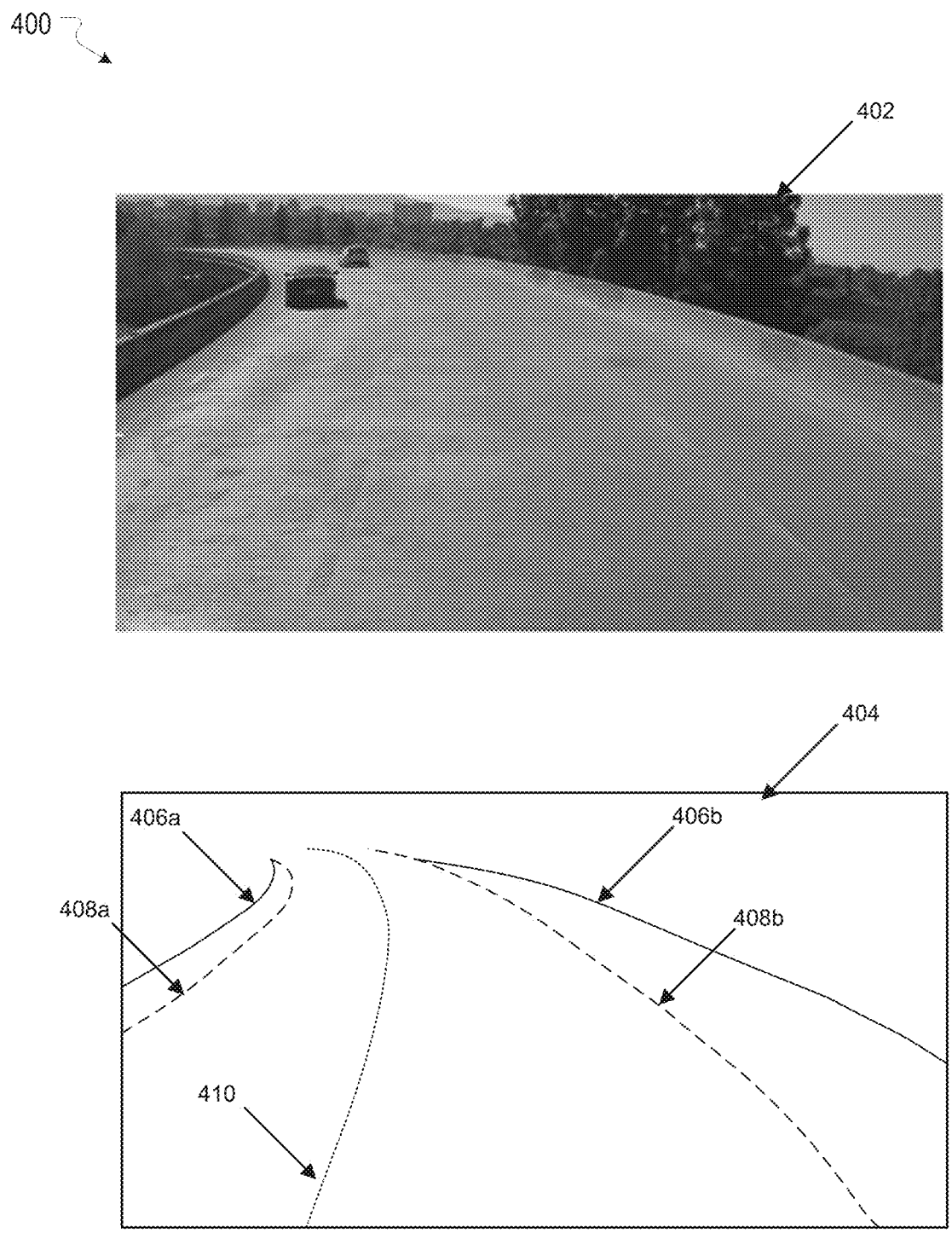
FIGS. 4A-4B illustrate examples of generating lane boundary information, according to embodiments of the present technology.
Figure 4B:
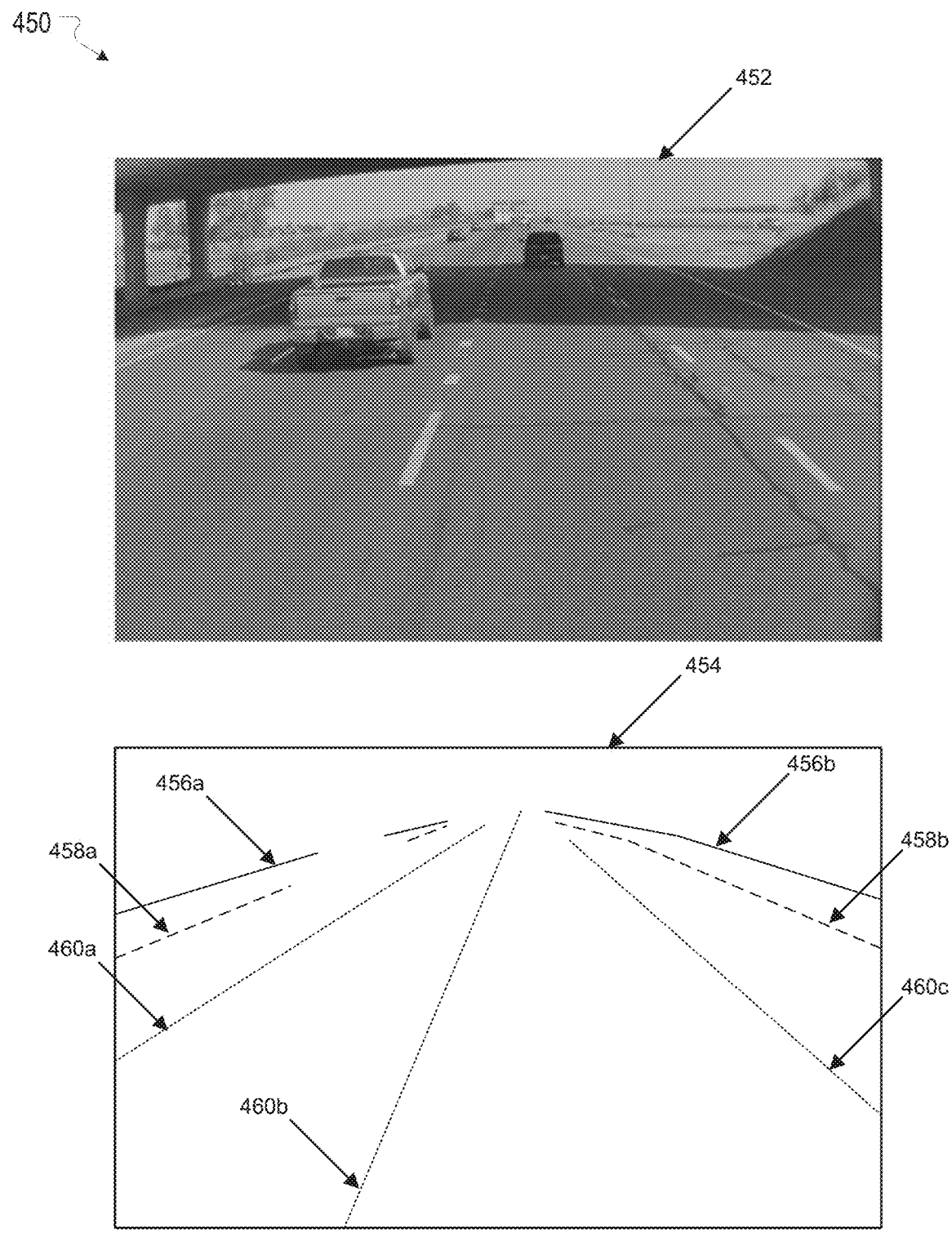

FIGS. 4A-4B illustrate examples of generating lane boundary information, according to some embodiments of the present technology. The lane boundary information can be generated by, for example, the lane determination module 102 of FIG. 1. It should be understood that there can be additional, fewer, or alternative functionality or steps performed in similar or alternative orders, or in parallel, based on the various features and embodiments discussed herein unless otherwise stated.

FIG. 4A illustrates an example 400 of generating lane boundary information. As illustrated in FIG. 4A, the example 400 includes an image 402 of a highway environment. The image 402 of the highway environment has faded lane markings. The example 400 includes lane boundary information 404 generated based on the image 402. The lane boundary information 404 includes a drivable area marked by drivable area boundaries 406a, 406b. The drivable area includes a region within the drivable area boundaries 406a, 406b. The drivable area can be determined, for example, by a drivable area model. The lane boundary information 404 includes outer lane boundaries 408a, 408b. The outer lane boundaries 408a, 408b can be determined, for example, by a lane model. The lane boundary information 404 includes inner lane boundary 410. The inner lane boundary 410 can be determined by a lane determination model. The inner lane boundary 410 can be determined based on the drivable area and the outer lane boundaries 408a, 408b. Many variations are possible.

FIG. 4B illustrates an example 450 of generating lane boundary information. As illustrated in FIG. 4B, the example 450 includes an image 452 of a highway environment. The image 452 of the highway environment includes lane markings that are occluded by vehicles and patches that can trigger false positives. The example 450 includes lane boundary information 454 generated based on the image 452. The lane boundary information 454 includes a drivable area marked by drivable area boundaries 456a, 456b. The drivable area includes a region within the drivable area boundaries 456a, 456b. The drivable area can be determined, for example, by a drivable area model. The lane boundary information 454 includes outer lane boundaries 458a, 458b. The outer lane boundaries 458a, 458b can be determined, for example, by a lane model. The lane boundary information 454 includes inner lane boundaries 460a, 460b, 460c. The inner lane boundaries 460a, 460b, 460c can be determined by a lane determination model. The inner lane boundaries 460a, 460b, 460c can be determined based on the drivable area and the outer lane boundaries 458a, 458b. Many variations are possible.

Figure 5:
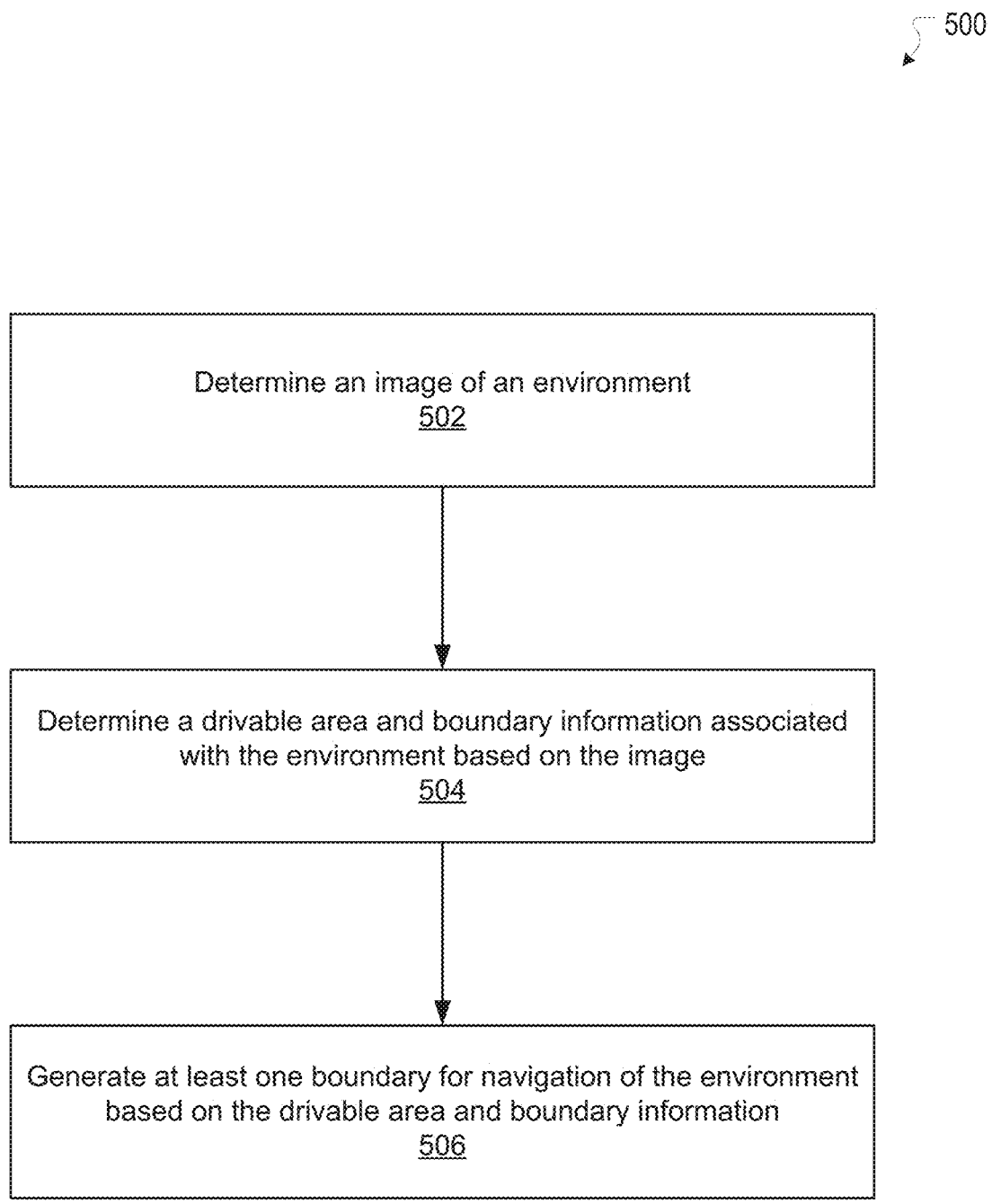
FIG. 5 illustrates an example method, according to embodiments of the present technology.

FIG. 5 illustrates an example method 500, according to embodiments of the present technology. At block 502, the example method 500 determines an image of an environment. At block 504, the example method 500 determines a drivable area and boundary information associated with the environment based on the image. At block 506, the example method 500 generates at least one boundary for navigation of the environment based on the drivable area and boundary information. Many variations to the example method are possible. It should be appreciated that there can be additional, fewer, or alternative steps performed in similar or alternative orders, or in parallel, within the scope of the various embodiments discussed herein unless otherwise stated.

It is contemplated that there can be many other uses, applications, and/or variations associated with the various embodiments of the present technology. For example, various embodiments of the present technology can learn, improve, and/or be refined over time.

Example Implementations

Figure 6:
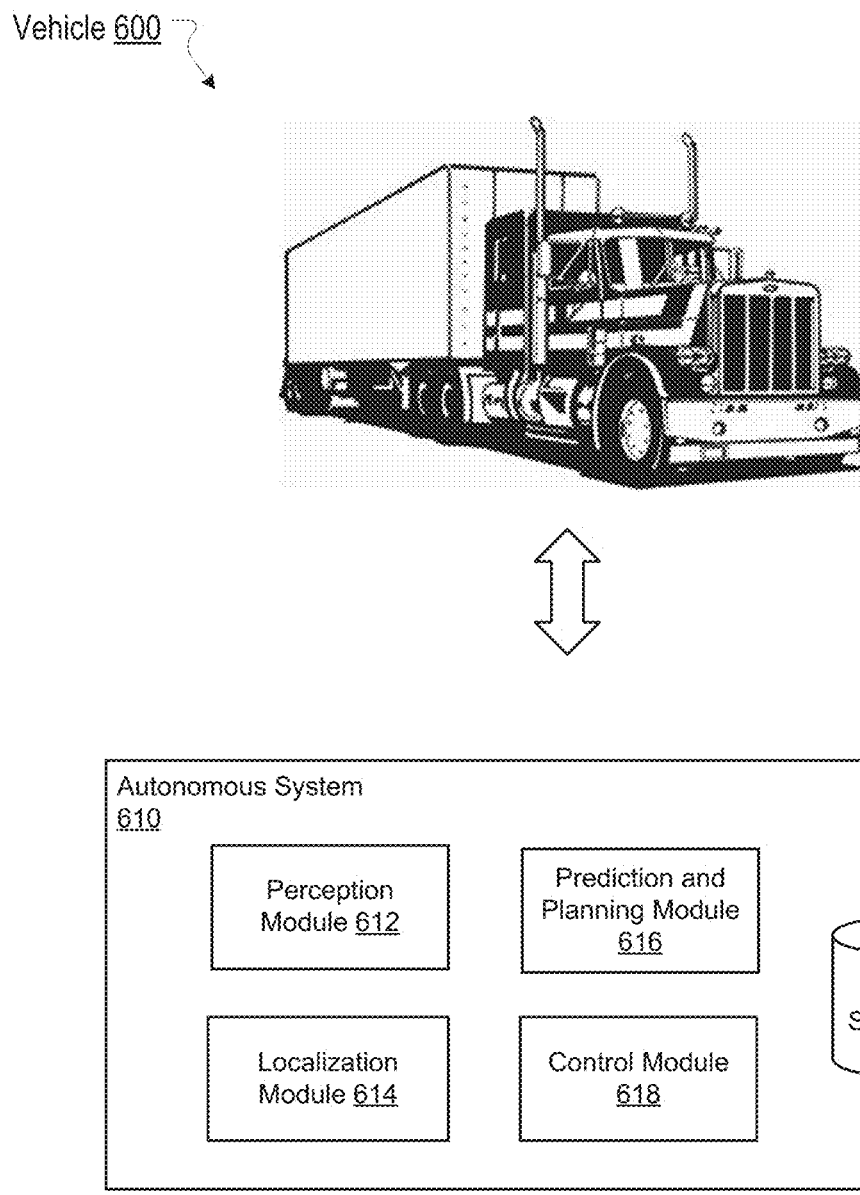
FIG. 6 illustrates an example vehicle, according to embodiments of the present technology.

FIG. 6 illustrates a vehicle 600 including an autonomous system 610, according to various embodiments of the present technology. The functionality and operation of the present technology, including the autonomous system 610, can be implemented in whole or in part by the vehicle 600. The present technology can cause desired control and navigation of the vehicle 600, as described herein. In some embodiments, the vehicle 600 is a truck, which can include a trailer. The truck can be of any size (e.g., medium truck, heavy truck, very heavy truck, etc.) or weight (e.g., greater than 14,000 pounds, greater than 26,000 pounds, greater than 70,000 pounds, etc.). The autonomous system 610 of the vehicle 600 can support and execute various modes of navigation of the vehicle 600. The autonomous system 610 can support and execute an autonomous driving mode, a semi-autonomous driving mode, and a driver assisted driving mode of the vehicle 600. The autonomous system 610 also can enable a manual driving mode. For operation of the vehicle 600, the autonomous system 610 can execute or enable one or more of the autonomous driving mode, the semi-autonomous driving mode, the driver assisted driving mode, and the manual driving mode, and selectively transition among the driving modes based on a variety of factors, such as operating conditions, vehicle capabilities, and driver preferences.

In some embodiments, the autonomous system 610 can include, for example, a perception module 612, a localization module 614, a prediction and planning module 616, and a control module 618. The functionality of the perception module 612, the localization module 614, the prediction and planning module 616, and the control module 618 of the autonomous system 610 are described in brief for purposes of illustration. The components (e.g., modules, elements, etc.) shown in this figure and all figures herein, as well as their described functionality, are exemplary only. Other implementations of the present technology may include additional, fewer, integrated, or different components and related functionality. Some components and related functionality may not be shown or described so as not to obscure relevant details. In various embodiments, one or more of the functionalities described in connection with the autonomous system 610 can be implemented in any suitable combinations.

The perception module 612 can receive and analyze various types of data about an environment in which the vehicle 600 is located. Through analysis of the various types of data, the perception module 612 can perceive the environment of the vehicle 600 and provide the vehicle 600 with critical information so that planning of navigation of the vehicle 600 is safe and effective. For example, the perception module 612 can determine the pose, trajectories, size, shape, and type of obstacles in the environment of the vehicle 600. Various models, such as machine learning models, can be utilized in such determinations.

The various types of data received by the perception module 812 can be any data that is supportive of the functionality and operation of the present technology. For example, the data can be attributes of the vehicle 600, such as location, velocity, acceleration, weight, and height of the vehicle 600. As another example, the data can relate to topographical features in the environment of the vehicle 600, such as traffic lights, road signs, lane markers, landmarks, buildings, structures, trees, curbs, bodies of water, etc. As yet another example, the data can be attributes of dynamic obstacles in the surroundings of the vehicle 600, such as location, velocity, acceleration, size, type, and movement of vehicles, persons, animals, road hazards, etc.

Sensors can be utilized to capture the data. The sensors can include, for example, cameras, radar, LiDAR (light detection and ranging), GPS (global positioning system), IMUs (inertial measurement units), and sonar. The sensors can be appropriately positioned at various locations (e.g., front, back, sides, top, bottom) on or in the vehicle 600 to optimize the collection of data. The data also can be captured by sensors that are not mounted on or in the vehicle 600, such as data captured by another vehicle (e.g., another truck) or by non-vehicular sensors located in the environment of the vehicle 600.

The localization module 614 can determine the pose of the vehicle 600. Pose of the vehicle 600 can be determined in relation to a map of an environment in which the vehicle 600 is traveling. Based on data received by the vehicle 600, the localization module 614 can determine distances and directions of features in the environment of the vehicle 600. The localization module 614 can compare features detected in the data with features in a map (e.g., HD map) to determine the pose of the vehicle 600 in relation to the map. The features in the map can include, for example, traffic lights, crosswalks, road signs, lanes, road connections, stop lines, etc. The localization module 614 can allow the vehicle 600 to determine its location with a high level of precision that supports optimal navigation of the vehicle 600 through the environment.

The prediction and planning module 616 can plan motion of the vehicle 600 from a start location to a destination location. The prediction and planning module 616 can generate a route plan, which reflects high level objectives, such as selection of different roads to travel from the start location to the destination location. The prediction and planning module 616 also can generate a behavioral plan with more local focus. For example, a behavioral plan can relate to various actions, such as changing lanes, merging onto an exit lane, turning left, passing another vehicle, etc. In addition, the prediction and planning module 616 can generate a motion plan for the vehicle 800 that navigates the vehicle 600 in relation to the predicted location and movement of other obstacles so that collisions are avoided. The prediction and planning module 616 can perform its planning operations subject to certain constraints. The constraints can be, for example, to ensure safety, to minimize costs, and to enhance comfort.

Based on output from the prediction and planning module 616, the control module 618 can generate control signals that can be communicated to different parts of the vehicle 600 to implement planned vehicle movement. The control module 618 can provide control signals as commands to actuator subsystems of the vehicle 600 to generate desired movement. The actuator subsystems can perform various functions of the vehicle 600, such as braking, acceleration, steering, signaling, etc.

The autonomous system 610 can include a data store 620. The data store 620 can be configured to store and maintain information that supports and enables operation of the vehicle 600 and functionality of the autonomous system 610. The information can include, for example, instructions to perform the functionality of the autonomous system 610, data captured by sensors, data received from a remote computing system, parameter values reflecting vehicle states, map data, machine learning models, algorithms, vehicle operation rules and constraints, navigation plans, etc.

The autonomous system 610 of the vehicle 600 can communicate over a communications network with other computing systems to support navigation of the vehicle 600. The communications network can be any suitable network through which data can be transferred between computing systems. Communications over the communications network involving the vehicle 600 can be performed in real time (or near real time) to support navigation of the vehicle 600.

The autonomous system 610 can communicate with a remote computing system (e.g., server, server farm, peer computing system) over the communications network. The remote computing system can include an autonomous system, and perform some or all of the functionality of the autonomous system 610. In some embodiments, the functionality of the autonomous system 610 can be distributed between the vehicle 600 and the remote computing system to support navigation of the vehicle 600. For example, some functionality of the autonomous system 610 can be performed by the remote computing system and other functionality of the autonomous system 610 can be performed by the vehicle 600. In some embodiments, a fleet of vehicles including the vehicle 600 can communicate data captured by the fleet to a remote computing system controlled by a provider of fleet management services. The remote computing system in turn can aggregate and process the data captured by the fleet. The processed data can be selectively communicated to the fleet, including vehicle 600, to assist in navigation of the fleet as well as the vehicle 600 in particular. In some embodiments, the autonomous system 610 of the vehicle 600 can directly communicate with a remote computing system of another vehicle. For example, data captured by the other vehicle can be provided to the vehicle 600 to support navigation of the vehicle 600, and vice versa. The vehicle 600 and the other vehicle can be owned by the same entity in some instances. In other instances, the vehicle 600 and the other vehicle can be owned by different entities.

In various embodiments, the functionalities described herein with respect to the present technology can be implemented, in part or in whole, as software, hardware, or any combination thereof. In some cases, the functionalities described with respect to the present technology can be implemented, in part or in whole, as software running on one or more computing devices or systems. In a further example, the functionalities described with respect to the present technology can be implemented using one or more computing devices or systems that include one or more servers, such as network servers or cloud servers. It should be understood that there can be many variations or other possibilities.

Figure 7:
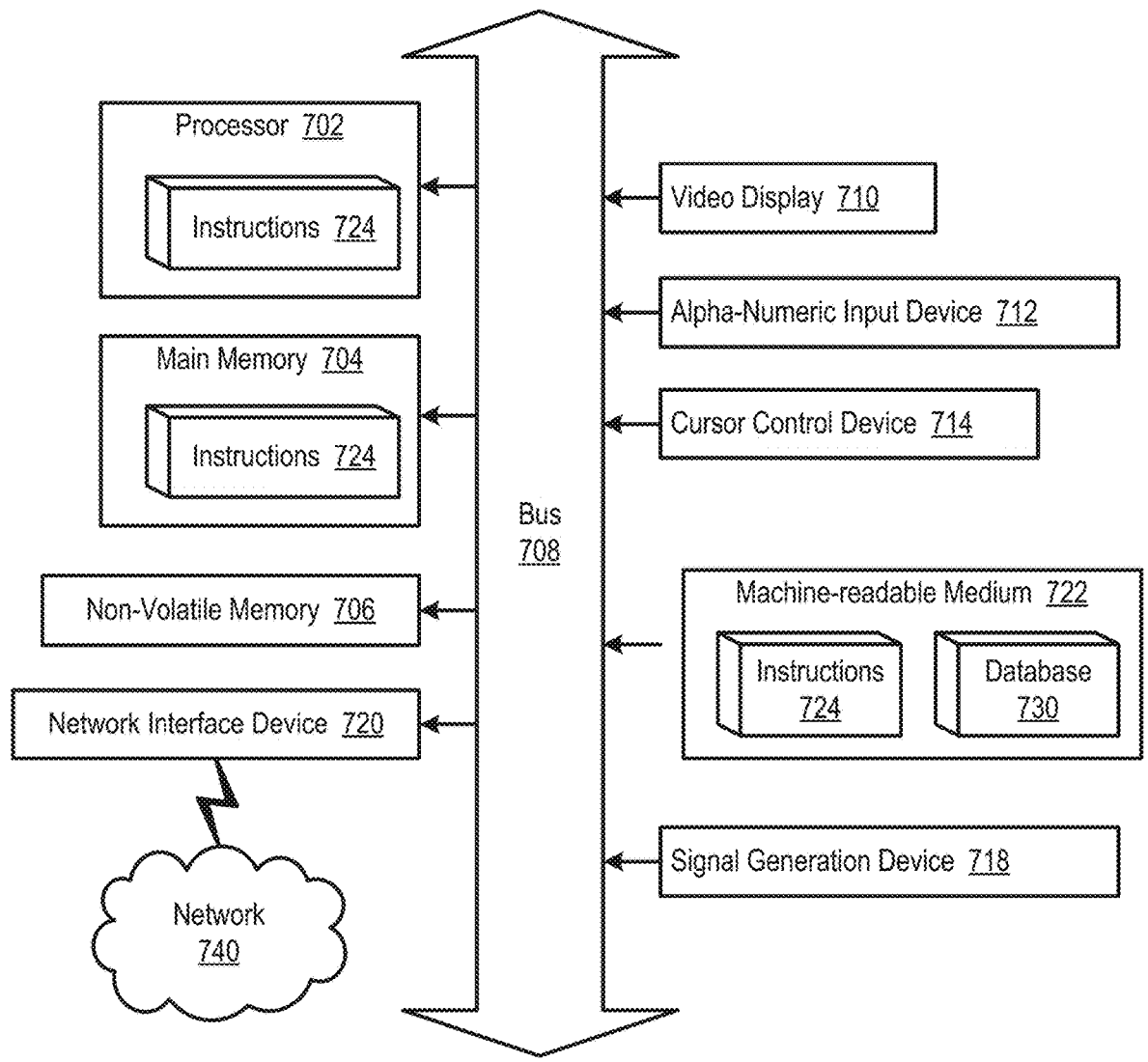
FIG. 7 illustrates an example computing system, according to embodiments of the present technology.

FIG. 7 illustrates an example of a computer system 700 that may be used to implement one or more of the embodiments of the present technology. The computer system 700 can be included in a wide variety of local and remote machine and computer system architectures and in a wide variety of network and computing environments that can implement the functionalities of the present technology. The computer system 700 includes sets of instructions 724 for causing the computer system 700 to perform the functionality, features, and operations discussed herein. The computer system 700 may be connected (e.g., networked) to other machines and/or computer systems. In a networked deployment, the computer system 700 may operate in the capacity of a server or a client machine in a client-server network environment, or as a peer machine in a peer-to-peer (or distributed) network environment.

The computer system 700 includes a processor 702 (e.g., a central processing unit (CPU), a graphics processing unit (GPU), or both), a main memory 704, and a nonvolatile memory 706 (e.g., volatile RAM and non-volatile RAM, respectively), which communicate with each other via a bus 708. In some embodiments, the computer system 700 can be a desktop computer, a laptop computer, personal digital assistant (PDA), or mobile phone, for example. In one embodiment, the computer system 700 also includes a video display 710, an alphanumeric input device 712 (e.g., a keyboard), a cursor control device 714 (e.g., a mouse), a signal generation device 718 (e.g., a speaker) and a network interface device 720.

In one embodiment, the video display 710 includes a touch sensitive screen for user input. In one embodiment, the touch sensitive screen is used instead of a keyboard and mouse. A machine-readable medium 722 can store one or more sets of instructions 724 (e.g., software) embodying any one or more of the methodologies, functions, or operations described herein. The instructions 724 can also reside, completely or at least partially, within the main memory 704 and/or within the processor 702 during execution thereof by the computer system 700. The instructions 724 can further be transmitted or received over a network 740 via the network interface device 720. In some embodiments, the machine-readable medium 722 also includes a database 730.

Volatile RAM may be implemented as dynamic RAM (DRAM), which requires power continually in order to refresh or maintain the data in the memory. Non-volatile memory is typically a magnetic hard drive, a magnetic optical drive, an optical drive (e.g., a DVD RAM), or other type of memory system that maintains data even after power is removed from the system. The non-volatile memory 706 may also be a random access memory. The non-volatile memory 706 can be a local device coupled directly to the rest of the components in the computer system 700. A non-volatile memory that is remote from the system, such as a network storage device coupled to any of the computer systems described herein through a network interface such as a modem or Ethernet interface, can also be used.

While the machine-readable medium 722 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the present technology. Examples of machine-readable media (or computer-readable media) include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

In general, routines executed to implement the embodiments of the invention can be implemented as part of an operating system or a specific application, component, program, object, module, or sequence of instructions referred to as "programs" or "applications." For example, one or more programs or applications can be used to execute any or all of the functionality, techniques, and processes described herein. The programs or applications typically comprise one or more instructions set at various times in various memory and storage devices in the machine and that, when read and executed by one or more processors, cause the computing system 600 to perform operations to execute elements involving the various aspects of the embodiments described herein.

The executable routines and data may be stored in various places, including, for example, ROM, volatile RAM, non-volatile memory, and/or cache memory. Portions of these routines and/or data may be stored in any one of these storage devices. Further, the routines and data can be obtained from centralized servers or peer-to-peer networks. Different portions of the routines and data can be obtained from different centralized servers and/or peer-to-peer networks at different times and in different communication sessions, or in a same communication session. The routines and data can be obtained in entirety prior to the execution of the applications. Alternatively, portions of the routines and data can be obtained dynamically, just in time, when needed for execution. Thus, it is not required that the routines and data be on a machine-readable medium in entirety at a particular instance of time.

While embodiments have been described fully in the context of computing systems, those skilled in the art will appreciate that the various embodiments are capable of being distributed as a program product in a variety of forms, and that the embodiments described herein apply equally regardless of the particular type of machine- or computer-readable media used to actually affect the distribution.

Alternatively, or in combination, the embodiments described herein can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

For purposes of explanation, numerous specific details are set forth in order to provide a thorough understanding of the description. It will be apparent, however, to one skilled in the art that embodiments of the technology can be practiced without these specific details. In some instances, modules, structures, processes, features, and devices are shown in block diagram form in order to avoid obscuring the description or discussed herein. In other instances, functional block diagrams and flow diagrams are shown to represent data and logic flows. The components of block diagrams and flow diagrams (e.g., modules, engines, blocks, structures, devices, features, etc.) may be variously combined, separated, removed, reordered, and replaced in a manner other than as expressly described and depicted herein.

Reference in this specification to "one embodiment," "an embodiment," "other embodiments," "another embodiment," "in various embodiments," "in an example," "in one implementation," or the like means that a particular feature, design, structure, or characteristic described in connection with the embodiment is included in at least one embodiment of the technology. The appearances of, for example, the phrases "according to an embodiment," "in one embodiment," "in an embodiment," "in various embodiments," or "in another embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments but also variously omitted in other embodiments. Similarly, various features are described which may be preferences or requirements for some embodiments but not other embodiments.

Although embodiments have been described with reference to specific exemplary embodiments, it will be evident that the various modifications and changes can be made to these embodiments. Accordingly, the specification and drawings are to be regarded in an illustrative sense rather than in a restrictive sense. The foregoing specification provides a description with reference to specific exemplary embodiments. It will be evident that various modifications can be made thereto without departing from the broader spirit and scope as set forth in the following claims. The specification and drawings are, accordingly, to be regarded in an illustrative sense rather than a restrictive sense.

Although some of the drawings illustrate a number of operations or method steps in a particular order, steps that are not order dependent may be reordered and other steps may be combined or omitted. While some reordering or other groupings are specifically mentioned, others will be apparent to those of ordinary skill in the art and so do not present an exhaustive list of alternatives. Moreover, it should be recognized that the stages could be implemented in hardware, firmware, software, or any combination thereof.

It should also be understood that a variety of changes may be made without departing from the essence of the invention. Such changes are also implicitly included in the description. They still fall within the scope of this invention. It should be understood that this technology is intended to yield a patent covering numerous aspects of the invention, both independently and as an overall system, and in method, computer readable medium, and apparatus modes.

Further, each of the various elements of the invention and claims may also be achieved in a variety of manners. This technology should be understood to encompass each such variation, be it a variation of an embodiment of any apparatus (or system) embodiment, a method or process embodiment, a computer readable medium embodiment, or even merely a variation of any element of these.

Further, the use of the transitional phrase "comprising" is used to maintain the "open-end" claims herein, according to traditional claim interpretation. Thus, unless the context requires otherwise, it should be understood that the term "comprise" or variations such as "comprises" or "comprising," are intended to imply the inclusion of a stated element or step or group of elements or steps, but not the exclusion of any other element or step or group of elements or steps. Such terms should be interpreted in their most expansive forms so as to afford the applicant the broadest coverage legally permissible in accordance with the following claims.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the technology of the embodiments of the invention is intended to be illustrative, but not limiting, of the scope of the invention, which is set forth in the following claims.

What is claimed is:

1. A computer-implemented method comprising:
   determining, by a computing system, an image of an environment that includes at least one lane;
   determining, by the computing system, a drivable area and boundary information associated with the environment based on the image, wherein the drivable area is determined based on a first machine learning model and the boundary information is determined based on a second machine learning model, and the first machine learning model and the second machine learning model share a neck and a backbone;
   generating, by the computing system, at least one first boundary for navigation of the at least one lane based on the drivable area and boundary information, wherein the at least one boundary corresponds with the at least one lane, the at least one first boundary generated based on a third machine learning model that receives, as input, a combination of the drivable area and at least one solid lane, training data to train the third machine learning model comprising segmentations of drivable area and outer lane information generated based on the first machine learning model and the second machine learning model and labelled segmentations of inner lane information generated based on the second machine learning model;
   comparing, by the computing system, the at least one first boundary for navigation and at least one second boundary for navigation generated based on detections of lane markings of the at least one lane to at least one prior lane boundary for navigation of the at least one lane; and
   causing, by the computing system, control of an operation of a vehicle in the at least one lane based on the at least one first boundary based on the comparing.

2. The computer-implemented method of claim 1, further comprising:
   generating, by the computing system, a combined data item that includes the drivable area and the boundary information, wherein the at least one first boundary for navigation is generated based on the combined data item.

3. The computer-implemented method of claim 1, further comprising:
   extracting, by the computing system, outer lane information from the boundary information, wherein the at least one first boundary for navigation is generated based on the outer lane information.

4. The computer-implemented method of claim 1, further comprising:
   flagging, by the computing system, data associated with the detections of the lane markings based on a difference between the at least one first boundary for navigation and the at least one second boundary for navigation that exceeds a threshold difference value.

5. The computer-implemented method of claim 1, wherein the at least one first boundary for navigation of the environment is generated based on a first segmentation associated with the drivable area and a second segmentation associated with the boundary information.

6. The computer-implemented method of claim 5, wherein the first segmentation includes segments with first values that indicate pixels in the image correspond with a drivable area or a non-drivable area, and wherein the second segmentation includes segments with second values that indicate the pixels in the image correspond with a dashed lane, a solid lane, a road curb, or a road shoulder.

7. The computer-implemented method of claim 1, wherein the backbone extracts features from the image, and wherein the neck combines the features for information shared among the first machine learning model and the second machine learning model.

8. The computer-implemented method of claim 1, wherein determining the drivable area and the boundary information comprises:
   generating, by the computing system, a segmentation based on the image, wherein the segmentation includes segments with values that indicate confidence levels the segments correspond with the drivable area;
   removing, by the computing system, the segments with values that fail to satisfy a threshold confidence level from the segmentation;
   applying, by the computing system, an activation function to the segmentation.

9. A system comprising:
   at least one processor; and
   a memory storing instructions that, when executed by the at least one processor, cause the system to perform operations comprising:
      determining an image of an environment that includes at least one lane;
      determining a drivable area and boundary information associated with the environment based on the image, wherein the drivable area is determined based on a first machine learning model and the boundary information is determined based on a second machine learning model, and the first machine learning model and the second machine learning model share a neck and a backbone;
      generating at least one first boundary for navigation of the at least one lane based on the drivable area and boundary information, wherein the at least one boundary corresponds with the at least one lane, the at least one first boundary generated based on a third machine learning model that receives, as input, a combination of the drivable area and at least one solid lane, training data to train the third machine learning model comprising segmentations of drivable area and outer lane information generated based on the first machine learning model and the second machine learning model and labelled segmentations of inner lane information generated based on the second machine learning model;

comparing the at least one first boundary for navigation and at least one second boundary for navigation generated based on detections of lane markings of the at least one lane to at least one prior lane boundary for navigation of the at least one lane; and causing control of an operation of a vehicle in the at least one lane based on the at least one first boundary based on the comparing.

10. The system of claim 9, wherein the operations further comprise:

generating a combined data item that includes the drivable area and the boundary information, wherein the at least one first boundary for navigation is generated based on the combined data item.

11. The system of claim 9, wherein the operations further comprise:

extracting outer lane information from the boundary information, wherein the at least one first boundary for navigation is generated based on the outer lane information.

12. The system of claim 9, wherein the operations further comprise:

flagging data associated with the detections of the lane markings based on a difference between the at least one first boundary for navigation and the at least one second boundary for navigation that exceeds a threshold difference value.

13. The system of claim 9, wherein the at least one first boundary for navigation of the environment is generated based on a first segmentation associated with the drivable area and a second segmentation associated with the boundary information.

14. The system of claim 13, wherein the first segmentation includes segments with first values that indicate pixels in the image correspond with a drivable area or a non-drivable area, and wherein the second segmentation includes segments with second values that indicate the pixels in the image correspond with a dashed lane, a solid lane, a road curb, or a road shoulder.

15. A non-transitory computer-readable storage medium including instructions that, when executed by at least one processor of a computing system, cause the computing system to perform operations comprising:

determining an image of an environment that includes at least one lane;

determining a drivable area and boundary information associated with the environment based on the image, wherein the drivable area is determined based on a first machine learning model and the boundary information is determined based on a second machine learning model, and the first machine learning model and the second machine learning model share a neck and a backbone;

generating at least one first boundary for navigation of the at least one lane based on the drivable area and boundary information, wherein the at least one boundary corresponds with the at least one lane, the at least one first boundary generated based on a third machine learning model that receives, as input, a combination of the drivable area and at least one solid lane, training data to train the third machine learning model comprising segmentations of drivable area and outer lane information generated based on the first machine learning model and the second machine learning model and labelled segmentations of inner lane information generated based on the second machine learning model;

comparing the at least one first boundary for navigation and at least one second boundary for navigation generated based on detections of lane markings of the at least one lane to at least one prior lane boundary for navigation of the at least one lane; and causing control of an operation of a vehicle in the at least one lane based on the at least one first boundary for navigation based on the comparing.

16. The non-transitory computer-readable storage medium of claim 15, wherein the operations further comprise:

generating a combined data item that includes the drivable area and the boundary information, wherein the at least one first boundary for navigation is generated based on the combined data item.

17. The non-transitory computer-readable storage medium of claim 15, wherein the operations further comprise:

extracting outer lane information from the boundary information, wherein the at least one first boundary for navigation is generated based on the outer lane information.

18. The non-transitory computer-readable storage medium of claim 15, wherein the operations further comprise:

flagging data associated with the detections of the lane markings based on a difference between the at least one first boundary for navigation and the at least one second boundary for navigation that exceeds a threshold difference value.

19. The non-transitory computer-readable storage medium of claim 15, wherein the at least one first boundary for navigation of the environment is generated based on a first segmentation associated with the drivable area and a second segmentation associated with the boundary information.

20. The non-transitory computer-readable storage medium of claim 19, wherein the first segmentation includes segments with first values that indicate pixels in the image correspond with a drivable area or a non-drivable area, and wherein the second segmentation includes segments with second values that indicate the pixels in the image correspond with a dashed lane, a solid lane, a road curb, or a road shoulder.

* * * * *